(12) United States Patent
Guntuku et al.

(10) Patent No.: US 11,763,215 B2
(45) Date of Patent: *Sep. 19, 2023

(54) SYSTEM AND METHODS FOR SCORING TELECOMMUNICATIONS NETWORK DATA USING REGRESSION CLASSIFICATION TECHNIQUES

(71) Applicant: Verizon Patent and Licensing Inc., Basking Ridge, NJ (US)

(72) Inventors: Kishore K. Guntuku, Ashburn, VA (US); Vamsi Krishna Boyapati, Metairie, LA (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/929,057

(22) Filed: Sep. 1, 2022

(65) Prior Publication Data

US 2023/0055976 A1 Feb. 23, 2023

Related U.S. Application Data

(63) Continuation of application No. 16/899,975, filed on Jun. 12, 2020, now Pat. No. 11,475,349.

(51) Int. Cl.
| | | |
|---|---|---|
| *G06Q 10/04* | (2023.01) | |
| *G06N 10/00* | (2022.01) | |
| *G01W 1/10* | (2006.01) | |
| *G06F 18/22* | (2023.01) | |
| *G06F 18/23211* | (2023.01) | |

(52) U.S. Cl.
CPC .............. *G06Q 10/04* (2013.01); *G01W 1/10* (2013.01); *G06F 18/22* (2023.01); *G06F 18/23211* (2023.01); *G06N 10/00* (2019.01)

(58) Field of Classification Search
CPC ... G06N 10/00; G06F 18/22; G06F 18/23211; G01W 1/10; G06Q 10/04
USPC ......................................................... 706/45
See application file for complete search history.

(56) References Cited

U.S. PATENT DOCUMENTS

| | | | |
|---|---|---|---|
| 11,475,349 B2* | 10/2022 | Guntuku | .................. G06N 3/08 |
| 2016/0189175 A1 | 6/2016 | Li et al. | |
| 2020/0327364 A1* | 10/2020 | Hickerson | ............. G06F 16/906 |

* cited by examiner

*Primary Examiner* — Michael R Neff

(57) ABSTRACT

Systems and methods provide a demand forecasting and network optimization for telecommunications services in a network. The systems and methods use classical and quantum computing devices. The computing devices evaluate data types using statistical symmetry recognition and operate between classical and quantum environments. Computing devices receive deposited data, batch data, and streamed data that relates to telecommunications services and segregate the data into spatial and temporal factors. The computing devices receive an analytic request for a forecast of the telecommunications services and conduct a multi-class plural-factored elastic cluster (MPEC) analysis for the telecommunications services using the segregated data. The MPEC analysis includes generating vectors comprised of slopes from plural coefficients to determine demand elasticity from plural features. The computing devices generate, based on the multi-class plural-factored elastic cluster model, a real-time demand-based forecast for the telecommunications services, and output the demand-based forecast.

20 Claims, 12 Drawing Sheets

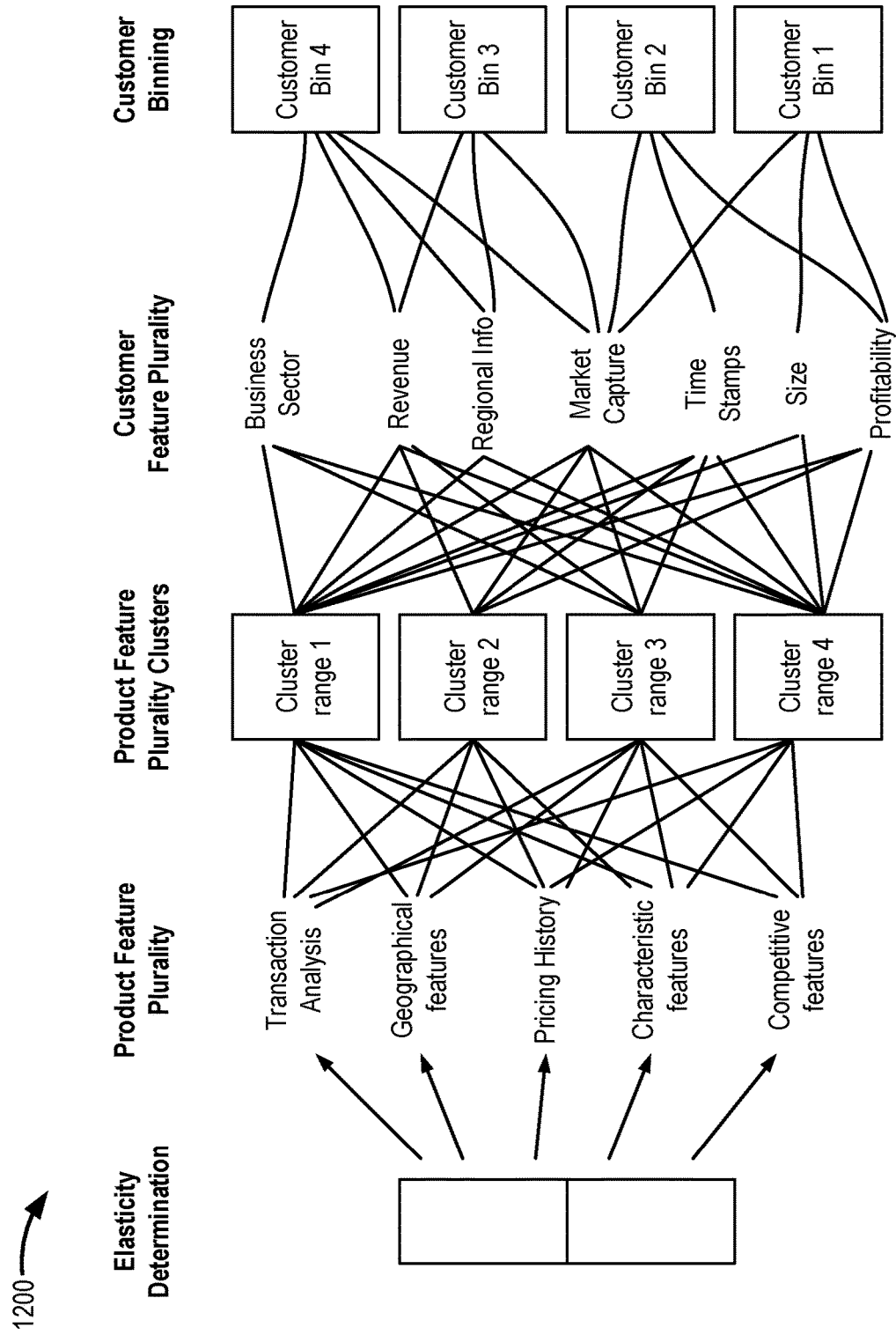

SYSTEM AND METHODS FOR SCORING TELECOMMUNICATIONS NETWORK DATA USING REGRESSION CLASSIFICATION TECHNIQUES

CROSS-REFERENCE TO RELATED APPLICATION

This application is a continuation of U.S. patent application Ser. No. 16/899,975, filed on Jun. 12, 2020, and titled "System and Methods for Scoring Telecommunications Network Data Using Regression Classification Techniques," the contents of which are incorporated herein by reference.

BACKGROUND

Modern telecommunications networks offer a number of different communications services, such as television services, data services, and telephone services provided over both wired and wireless platforms. Multiple developing and legacy systems support and enable these communication services. As technologies continue to develop, telecommunications providers must prioritize resource to meet increasing service demands.

Telecommunication corporations deal with unique problems in obtaining high-resolution key geographical (spatial) and temporal (time demand) insights in product development, product pricing, and product marketing forecast. The lack of resolution can result in a loss of physical and manual resources leading, for example, to unforeseen carbon footprint and wasted opportunities. Quantum computing infrastructure along with powerful machine learning algorithms will address the lack of such resolution with real-time processing of high volume data.

BRIEF DESCRIPTION OF THE DRAWINGS

FIG. 12 is an illustration of ideated fabric of an MPEC process, according to an exemplary implementation.

DETAILED DESCRIPTION OF EXAMPLE EMBODIMENTS

Figure 1:
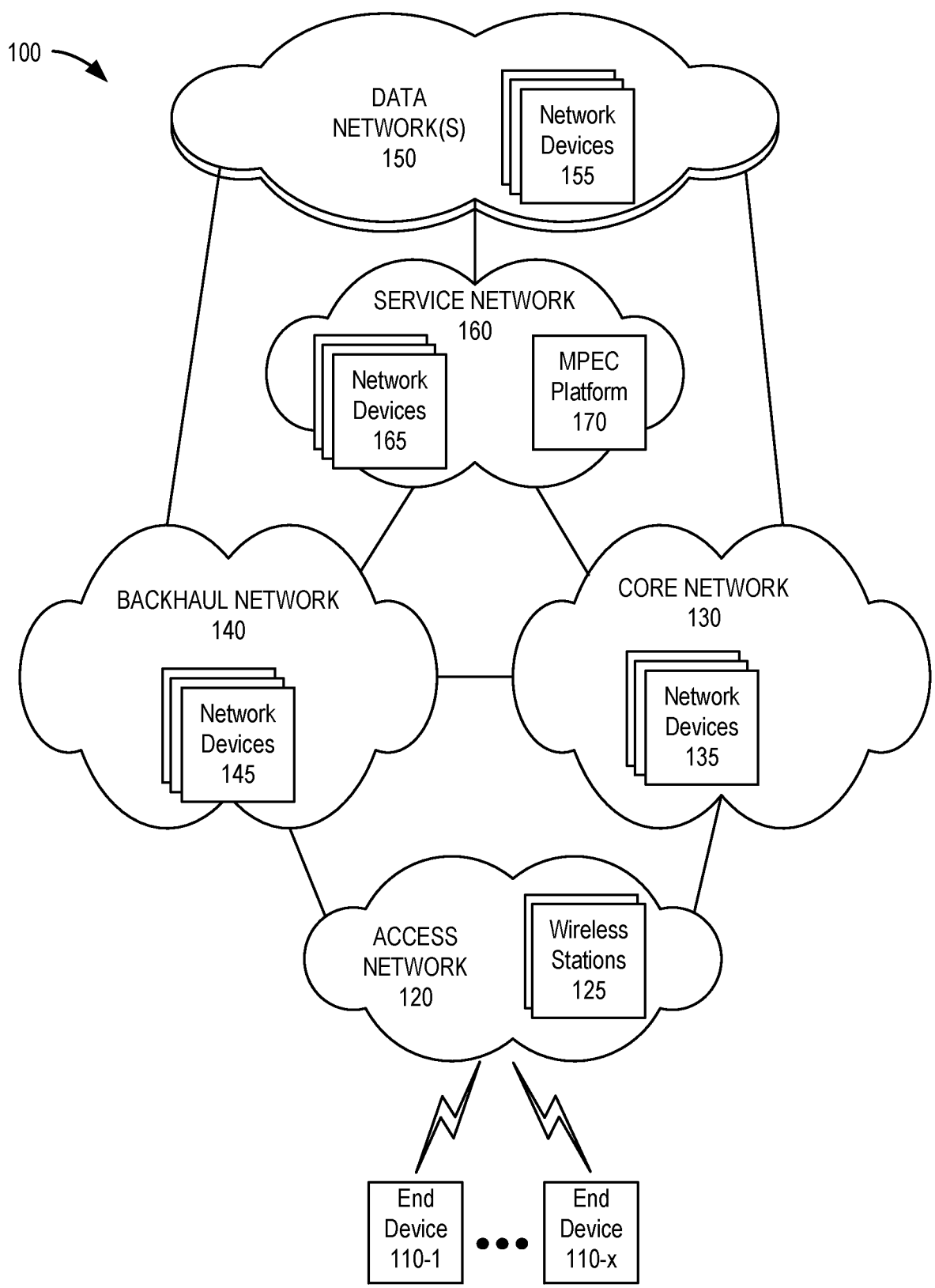
FIG. 1 is a diagram illustrating an exemplary environment in which an embodiment of a demand forecasting service may be implemented.

The following detailed description refers to the accompanying drawings. The same reference numbers in different drawings may identify the same or similar elements. Also, the following detailed description does not limit the invention.

Network service providers rely on increasing amounts and varieties of data to manage their networks. Network performance data, alarm data, alert data, event data, log data, live data, hardware data, Internet of Things (IoT) data, and many other types of data may be collected throughout a heterogeneous network environment. Particularly, granular geographic information enables strategic expansions, infrastructure development, and product development. Such granular geographic information is especially important in rolling out future wireless products and services that require short range transmission equipment (e.g., 5G New Radio services). Additionally, telecommunications service providers can benefit from the ability to harvest weather forecasts and event data for timely development of products for emergency responses, such as natural calamities including wild fires, pandemics, and infestations. Preparedness for such calamities requires accurate and granular spatial and temporal analytics.

One barrier to obtaining such granular data analytics is the ability to quickly provide combinatorial evaluation of demand coefficient and product features tailored to customer needs. A successful demand forecasting service needs to provide efficient processing of individual data components corresponding to (a) demand elasticity, (b) product features, (c) geographic granularity corresponding to consumption and infrastructure development feasibility, and (d) transaction data for customer segmentation, and then extract key factors from these input data components.

The demand forecasting service may combine transcending trends from (a) through (d) into segregated data formats. From the segregated data, the demand forecasting service can derive multi-class elastic clusters of customers, products, geographic, and/or time patterns using tailored and developed machine learning algorithms. The demand forecasting service trains the algorithms with controlled neural networks and develops high-resolution business-ready visualizations from granular data.

The technical data architecture and computing challenges to provide the demand forecasting service include: data acquisition and storage (e.g., with multiple data sources); data processing (e.g., processing pipeline); integrating machine learning with deep learning on a continuous basis for live feeds for real time visualizations (e.g., real time data feeds); and training the networks from repeated simulations of previously trained algorithms.

Systems and methods described herein include a demand forecasting service that provides granular information for different telecommunications demand forecasts in real-time. The systems and methods take into account factors such as weather conditions, catastrophic events, hardware, geography, marketing, sales, core logic, social media, raw materials forecast, etc., and prioritize the different factors in relation to product services and forecasting. According to an implementation, the systems and methods provide a unique infrastructure to apply a multi-class cluster algorithm, which may be referred to here as a Multi-Class Plural-Factored Elastic Clusters (MPEC) analysis, in quantum pipelines. The systems and methods provide an institutional quantum Artificial Intelligence (AI) infrastructure development in a cloud environment. The system and methods provide telecommunication product geographic demand forecasts, telecommunication product temporal demand forecasts, telecommunication service deployment forecasts, and telecommunication pricing refinement in both feature and demand dimensions.

The system and methods further provide weather-forecast-integrated elastic-cluster-based analytics for (a) emergency response preparedness, (b) institutional marketing forecasts, (c) institutional pricing forecasts, and (d) institutional sales forecasts.

Systems and methods described herein develop optimized, real-time and secure forecast methods from mainstream and social media sources. While the systems and methods described herein are discussed in the context of forecasting for telecommunication products and service development, other applications may be directed toward other industries, such as retail. Also, while certain components may be described with reference to the term MPEC, other analytical tools could be used to perform features described herein.

FIG. 1 is a diagram of an exemplary environment 100 in which the systems and/or methods, described herein, may be implemented. As shown in FIG. 1, environment 100 may include end devices 110-1 to 110-X (referred to herein collectively as "end devices 110" and individually as "end device 110"), an access network 120, a core network 130, a backhaul network 140, a data network 150, and a service network 160. According to an implementation, access network 120, core network 130, backhaul network 140, and service network 160 may be referred to as a "traffic network," which may be owned/operated by the same service provider. According to another implementation, one or more data networks 150 may also be included in the traffic network.

End device 110 includes a device that has computation and communication capabilities. End device 110 may be implemented as a mobile device, a portable device, or a stationary device. By way of further example, end device 110 may be implemented as a smartphone, a personal digital assistant, a tablet, a wearable device, a set top box, an infotainment system in a vehicle, a smart television, a gaming system, a music playing system, or some other type of user device. End device 110 may be implemented as a Machine Type Communication (MTC) device, an Internet of Things (IoT) device, a user device, or some other type of end node. According to various exemplary embodiments, end device 110 may be configured to execute various types of software (e.g., applications, programs, etc.). The number and the types of software may vary from one end device 110 to another end device 110.

Access network 120 includes one or multiple networks of one or multiple types. For example, access network 120 may be implemented to include a terrestrial network. According to an exemplary implementation, access network 120 includes a radio access network (RAN). For example, the RAN may be a Fourth Generation (4G) RAN, a Fifth Generation (5G) RAN, or a future generation RAN. By way of further example, access network 120 may include an Evolved UMTS Terrestrial Radio Access Network (E-UTRAN) of a Long Term Evolution (LTE) network or an LTE-Advanced (LTE-A) network. Access network 120 may also include other types of networks, such as a WiFi network, a local area network (LAN), a personal area network (PAN), or other type of network that provides access to or can be used as an on-ramp or interface to core network 130 or backhaul network 140. Depending on the implementation, access network 120 may include various types of network devices and wireless stations 125. For example, wireless station 125 of access network 120 may include a base station (BS), a base transceiver station (BTS), a Node B, an evolved Node B (eNB), a next generation Node B (gNB), a remote radio head (RRH), an RRH and a baseband unit (BBU), a BBU, and/or other type of node (e.g., wireless, wired, optical) that includes network communication capabilities.

Core network 130 may manage communication sessions for end devices 110. For example, core network 130 may establish an Internet Protocol (IP) connection between end device 110 and a particular data network 150. Furthermore, core network 130 may enable end device 110 to communicate with an application server, and/or another type of device, located in a particular data network 150 using a communication method that does not require the establishment of an IP connection between end device 110 and data network 150, such as, for example, Data over Non-Access Stratum (DoNAS). Depending on the implementation, core network 130 may include various network devices 135, such as a gateway, a support node, a serving node, a mobility management entity (MME), Access and Mobility Function (AMF), as well other network devices pertaining to various network-related functions, such as billing, security, authentication and authorization, network polices, subscriber profiles, and/or other network devices that facilitate the operation of core network 130.

Backhaul network 140 includes one or multiple networks of one or multiple types and technologies. According to an exemplary implementation, backhaul network 140 includes a backbone network. For example, the backbone network may be implemented as an optical transport network, an ultra-high capacity wireless backhaul network, an Ethernet backhaul network, a dark fiber network, or another suitable architecture (e.g., Internet Protocol (IP)/Multiprotocol Label Switching (MPLS), millimeter wave technology, etc.). Depending on the implementation, backhaul network 140 may include switches, routers, repeaters, various types of optical network elements (e.g., multiplexers, de-multiplexers, switches, transmitters, receivers, etc.), and/or other types of network devices. For purposes of illustration and description, network devices 145 may include various types of network devices that may be resident in backhaul network 140, as described herein. Backhaul network 140 may also include a fronthaul network.

Data network 150 may include a packet data network. A particular data network 150 may include, and/or be connected to and enable communication with, a local area network (LAN), a wide area network (WAN), a metropolitan area network (MAN), an optical network, a cable television network, a satellite network, a wireless network (e.g., a code division multiple access network, a general packet radio service (GPRS) network, and/or an LTE network), an ad hoc network, a telephone network (e.g., the Public Switched Telephone Network (PSTN) or a cellular network), an intranet, or a combination of networks. Some or all of a particular data network 150 may be managed by a communication services provider that also manages backhaul network 140, core network 130, radio access network 120, and/or particular end devices 110. For example, in some implementations, a particular data network 150 may include an IP Multimedia Sub-system (IMS) network (not shown in FIG. 1). An IMS network may include a network for delivering IP multimedia services and may provide media flows between two different end devices 110, and/or between a particular end device 110 and external IP networks or external circuit-switched networks (not shown in FIG. 1). Data network 150 may include various types of network devices 155, which may implement different network functions described further herein.

Service network 160 may include one or multiple networks of one or multiple types. For example, service network 160 may include a cloud network, a WAN, a MAN, a service provider network, a private IP network, some other type of backend network, and so forth. As illustrated, according to an exemplary embodiment, service network 160 includes network devices 165 and a MPEC platform 170.

Service network 160 may include various types of network devices 165, which may implement different network functions described further herein. For example, network devices 165 may provide various physical resources (e.g., processors, memory, storage, communication interface, etc.), software resources (e.g., operating system, etc.) and virtualization elements (e.g., hypervisor, container engine, etc.). According to other exemplary embodiments, MPEC platform 170 or portions thereof may be combined in a single device or a distributed environment. In another implementation, service network 160 may be included as part of another network, such core network 130, backhaul network 140, or data network 150.

MPEC platform 170 may include network devices for providing real-time forecasting geographic demand, such as for telecommunications services across the multiple networks in the traffic network of network environment 100 (e.g., devices in access network 120, core network 130, backhaul network 140, data network 150, and/or service network 160). As described further herein, MPEC platform 170 may implement a data ingestion process and a MPEC compute pipeline to generate geographic demand forecasts, telecommunication product temporal demand forecasts, telecommunication service deployment forecasts, and telecommunication pricing refinement in both feature and demand dimensions.

MPEC platform 170 and/or other network devices described herein may refer to a dedicated hardware component implementing a network function instance or to a hardware component that is part of a common shared physical infrastructure used to implement virtualized network function instances using software defined networking (SDN) or another type of virtualization technique. Thus, MPEC platform 170 may be configured to implement a particular network function instance as a Virtual Network Function (VNF) (e.g., in a virtual machine), as a Cloud-native Network Function (CNF) (e.g., in a container), as a serverless architecture event handler, and/or using a different type of virtualization. The common shared physical infrastructure may be implemented using one or more computer devices in a cloud computing center, a multi-access edge computing (MEC) system associated with a wireless station, and/or in another type of computer system.

The number and arrangement of devices in environment 100 are exemplary. According to other embodiments, environment 100 may include additional devices and/or differently arranged devices, than those illustrated in FIG. 1. The number and arrangement of networks in environment 100 are exemplary. According to other embodiments, environment 100 may include additional networks, fewer networks, and/or differently arranged networks than those illustrated in FIG. 1.

A network device, as described herein, may be implemented according to a centralized computing architecture, a distributed computing architecture, or a cloud computing architecture (e.g., an elastic cloud, a private cloud, a public cloud, etc.). Additionally, a network device may be implemented according to one or multiple network architectures (e.g., a client device, a server device, a peer device, a proxy device, and/or a cloud device).

Environment 100 includes links between the networks and between the devices. Environment 100 may be implemented to include wired, optical, and/or wireless links among the devices and the networks illustrated. A communicative connection via a link may be direct or indirect. For example, an indirect communicative connection may involve an intermediary device and/or an intermediary network not illustrated in FIG. 1. Additionally, the number and the arrangement of links illustrated in environment 100 are exemplary.

Figure 2:
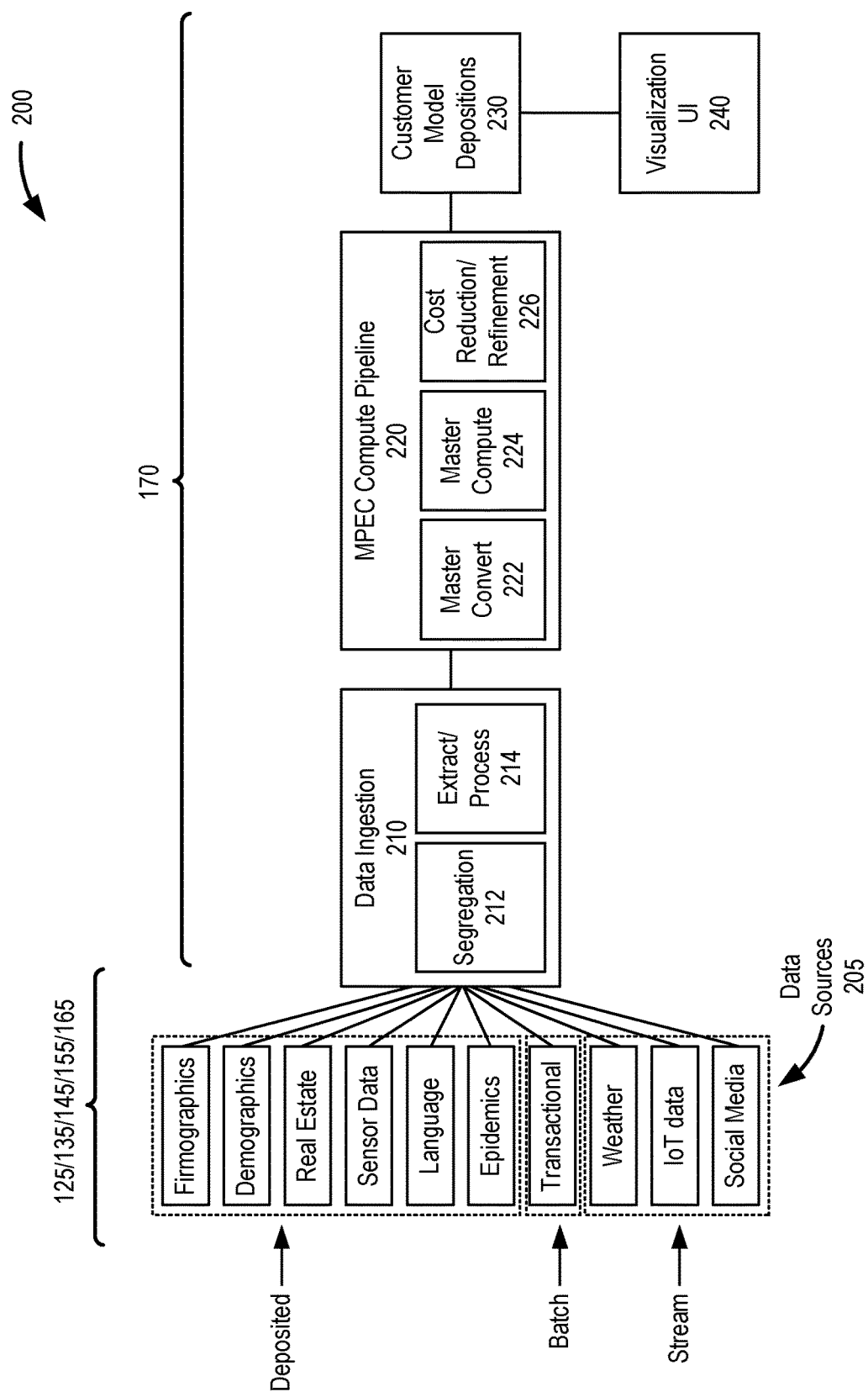
FIG. 2 is a diagram illustrating an exemplary configuration that may provide an embodiment of the demand forecasting service.

FIG. 2 is a diagram illustrating an exemplary implementation of a MPEC platform 170 configuration in which MPEC platform 170 may be communicatively coupled to data sources of network environment 100. As shown in FIG. 2, an environment 200, which is consistent with the traffic network of network environment 100, may include multiple data sources 205, data ingestion system 210, a MPEC compute pipeline 220, a customer model depositions 230, and visualization user interface (UI) 240. MPEC compute pipeline 220, a customer model depositions 230, and UI visualizations may be implemented, for example, in MPEC platform 170. MPEC pipelines as depicted in FIG. 2 enable the infrastructure for hybrid quantum computing and distribution of models built in the infrastructure.

Data sources 205 may include a computing device or network device that collects data to support network analytics and/or real-time network management. Data sources 205 may correspond, for example, to wireless stations 125 and/or network devices 135/145. In other implementations, data sources 205 may additionally correspond to network devices 155 and/or 165. Data generated by data sources 205 may include real-time data (e.g., streamed), batch data (e.g., periodically reported), and deposited (e.g., fixed or occasionally reported data). Examples of real-time data generated by data sources 205 may include, for example, weather data, IoT data, and social media data. An example of batch data generated by data sources 205 may include, for example, transactional data. Examples of deposited data generated by data sources 205 may include, for example, firmographics (e.g., firm demographics), demographics, real estate, language processed, epidemics, and sensor data. In another implementation, data generated by data sources 205 may include social media data, external internet scraping data, purchase-related data, etc. Data sources 205 may be configured to provide data to a data ingestion system 210.

Data ingestion system 210 may include logic that provides an ingestion service that collects, ingests, stores, and manages various types of data in support of the MPEC platform 170. According to an implementation, data ingestion system 210 may include a segregation unit 212 and an extract/process unit 214. Data ingestion system 210 may also include a mass storage device, such as an elastic storage server.

Segregation unit 212 may include logic that performs segregation of data from data sources 205, such as segregation based on spatial factors (e.g., geographic, distance, coverage areas, etc.) and temporal factors (e.g., time, periodicity, etc.).

Extract/process unit 214 may include logic to identify elasticity factors in data from data sources 205. In one implementation, elasticity factors may, for example, be configured by a user as part of an analytics request. In another implementation, elasticity factors may be defined for MPEC platform 170. Extract/process unit 214 may identify particular fields and/or formats in incoming data (from data source 205) with elasticity factors.

Data ingestion system 210 may additionally include logic that performs other storage-related and/or data management-related functions, such as, formatting data (e.g., transforming raw data into a particular format, etc.), compression and decompression, data integrity verification, adding data, deleting data, updating data, maintaining data quality, providing data access, extraction, encryption, classification of data, etc., for MPEC compute pipeline 220, a database, or another type of data structure.

MPEC compute pipeline 220 may include logic to perform master convert and master compute algorithms. According to an implementation, MPEC compute pipeline 220 may include a master convert unit 222, a master compute unit 224, and a cost reduction and refinement module 226.

Master convert unit 222 may include logic to perform master convert algorithms and sub algorithms. According to an implementation, master convert unit 222 may be implemented in a separate processing core from master compute unit 224. The MPEC convert algorithm facilitates the mechanics of either exclusive (classic or quantum) or inclusive (hybrid and classic) computing. The MPEC master convert algorithm enables decision making for conversion of data. Parameters, such as data type and data size, may be used as input parameters for decision making. Master convert unit 222 may convert data from classic bits to quantum bits with an estimate of computation cost, efficiency and urgency of analytics provision in both classical and quantum computing environment. In the case of output of data amenable for quick classic computing, the data is processed in a classic pipeline, as described in connection with FIG. 6. As described in connection with FIG. 7, in the case of output of quantum demanding data, data will be converted to use specific convert processes. Specific gates, operators etc., are used for specific data types in the conversion algorithm.

Master compute unit 224 may include logic to perform master compute algorithms and sub algorithms. As described further in connection with FIGS. 4-6, the master compute process may first generate vectors comprised of slopes from plural coefficients to determine demand elasticity from plural features. The vectors can be used to generate hypothetical barriers for plural clusters comprised of characteristic properties, resulting in multi-dimensional space for ultimately obtaining class bins for products and customers. The master compute process will engage several regressional and classification/segmentation algorithms as needed.

According to an implementation, the MPEC master compute algorithm (and the sub master compute algorithms) uses massive computing resources that run in real time. The computing loads may have high demands facilitated by distributed computing, parallel computing, and/or quantum computing or alternatively hybrid computing. The master compute may generate multiple multi-class bins, such as bins for geographic demand of products, time demand of products, geographic and/or time demand with differing product features, and weather forecast predicted preparedness informatics for emergency response based product development. For example, according to an implementation, the batch data or streamed data includes weather forecast data that is ingested into elastic clusters to provide emergency-related telecommunications predictions for natural disasters, such as hurricanes, floods, winter storms, etc.

Cost reduction and refinement module 226 may include logic to perform sub-master compute tasks. As described further in connection with FIGS. 4 and 5, the sub-master compute processes include supporting algorithms such as cost reduction, gradient boosts, and neural network algorithms.

Customer model depositions 230 may store analysis results responsive to, for example, a customer analytics request. Customer model depositions 230 may be implemented, for example, as an elastic storage server and/or cloud object storage.

Visualization UI 240 may provide high-resolution business-ready visualizations from results in customer model depositions 230. Visualization UI 240 may include an application accessed via end device 110, for example. Visualization UI 240 may provide results of the demand forecasting service, such as graphical displays, charts, maps, etc., that show the results from customer model depositions 230. According to an implementation, visualization UI 240 may receive dedicated application programming interface (API) calls from an application executed on end device 110. According to another implementation, visualization UI 240 may be a web-based interface accessed via a web browser.

Figure 3:
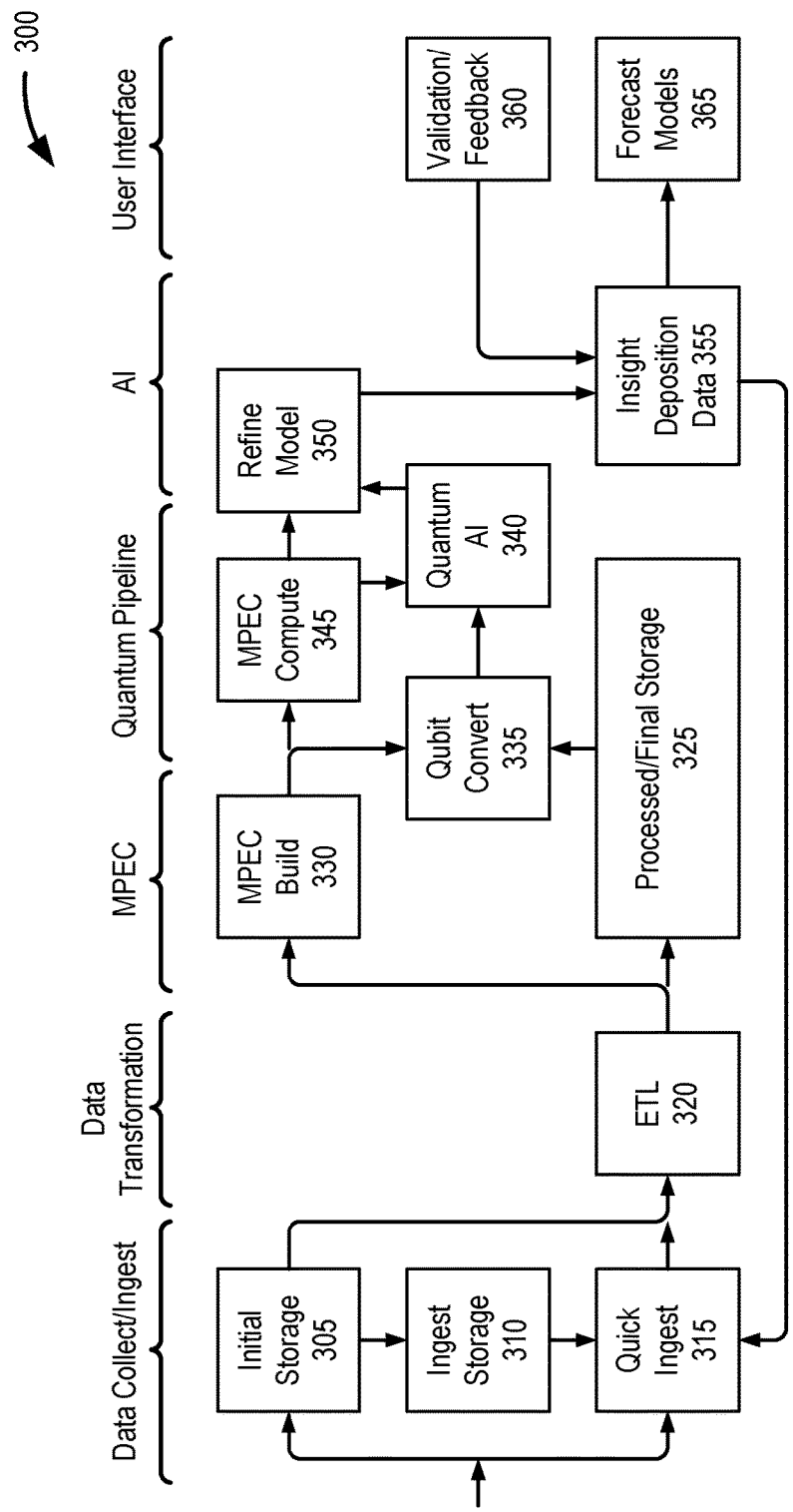
FIG. 3 is a diagram illustrating communications in a portion of the Multi-class Plural-factored Elastic Clusters (MPEC) platform of FIG. 2.

FIG. 3 is a diagram illustrating typical communications in a portion 300 of MPEC platform 170 for generating granular information for different telecommunications demand forecasts, according to an implementation. Data (e.g., from data sources 205) may be received into initial storage 305 or quick ingest 315. Initial storage 305 may receive, for example, deposited data from data sources 205, which may be stored in cloud object storage. Data from initial storage 305 may be ingested and stored in a separate cloud infrastructure 310. Quick ingest 315 may include an elastic storage component and perform real-time analytics for streaming data.

Data from initial storage 305 and/or quick ingest 315 may be fed into an extract, transform, and load (ETL) 320 processes that uses an elastic storage server to move data into and out of storage. ETL process 320 may transform segregated data into processed data that may be stored in processed/final storage 325 and simultaneously used to build an initial MPEC model 330. Processed/final storage 325 may include, for example, an elastic storage server, a cloud object storage, and/or a data warehouse.

MPEC build 330 may ingest data from ETL processes 320 to build an artificial intelligence model. For example, MPEC build 330 may use APACHE SPARK with DATALAKE AI to assemble an MPEC model. At qubit convert 335, if necessary, data may be converted from classic bits to qubits and quantum data optimization may be performed at quantum AI 340. MPEC compute 345 may apply recursive neural networks to associate plural elastic inputs and multi-class cluster inputs with output class bins. Model refinement 350 may perform cost reductions and/or other model refinements, and insight deposition data 355 may be stored in elastic storage and/or cloud object storage.

Using, for example, end device 110, a user may access insight deposition data 355 to provide validation and/or feedback at validation/feedback 360. Data from insight deposition data 355 may be presented as real-time forecasts for users (e.g., via end device 110) at forecast models 365.

Figure 4:
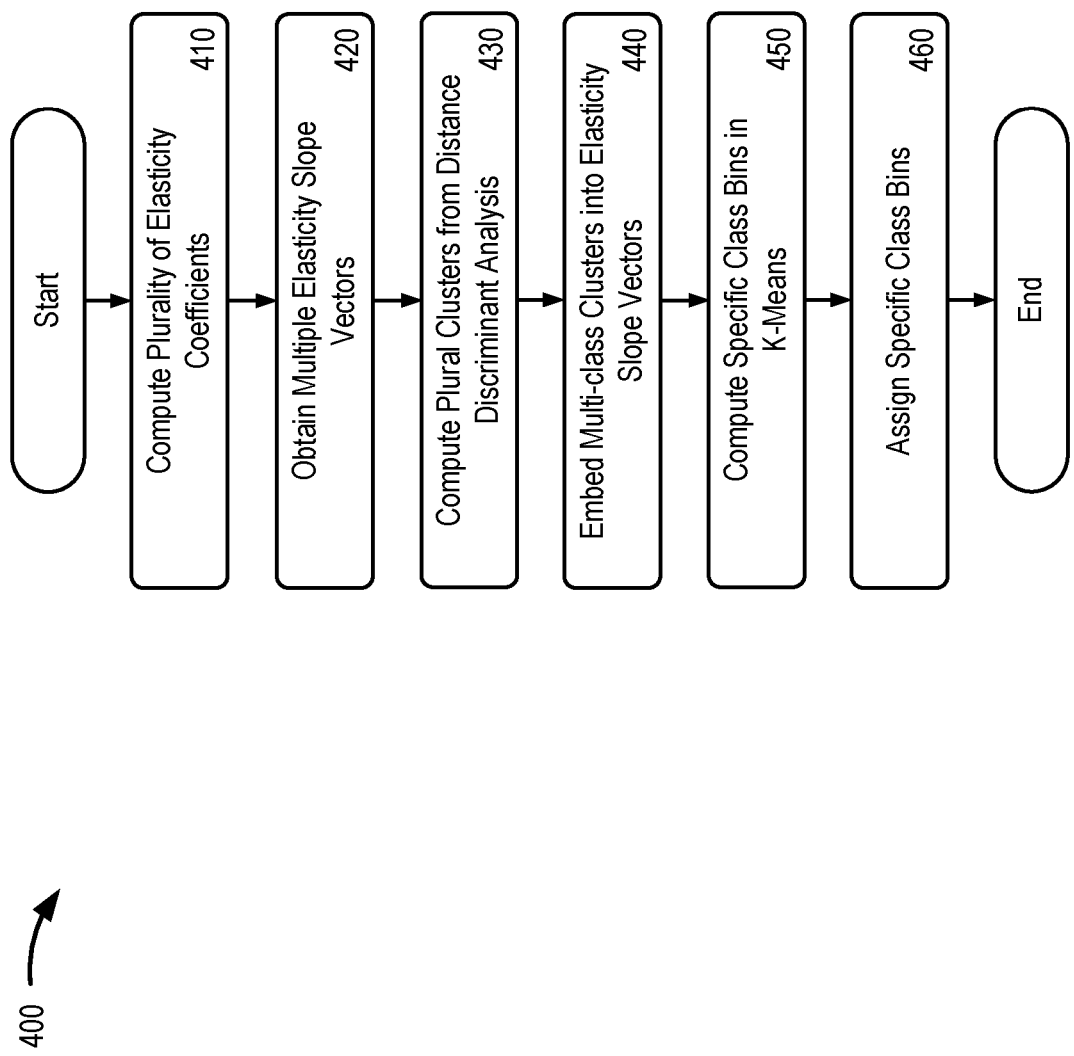
FIGS. 4-6 are flow diagrams illustrating an MPEC compute algorithm for the demand forecasting service.
Figure 5:
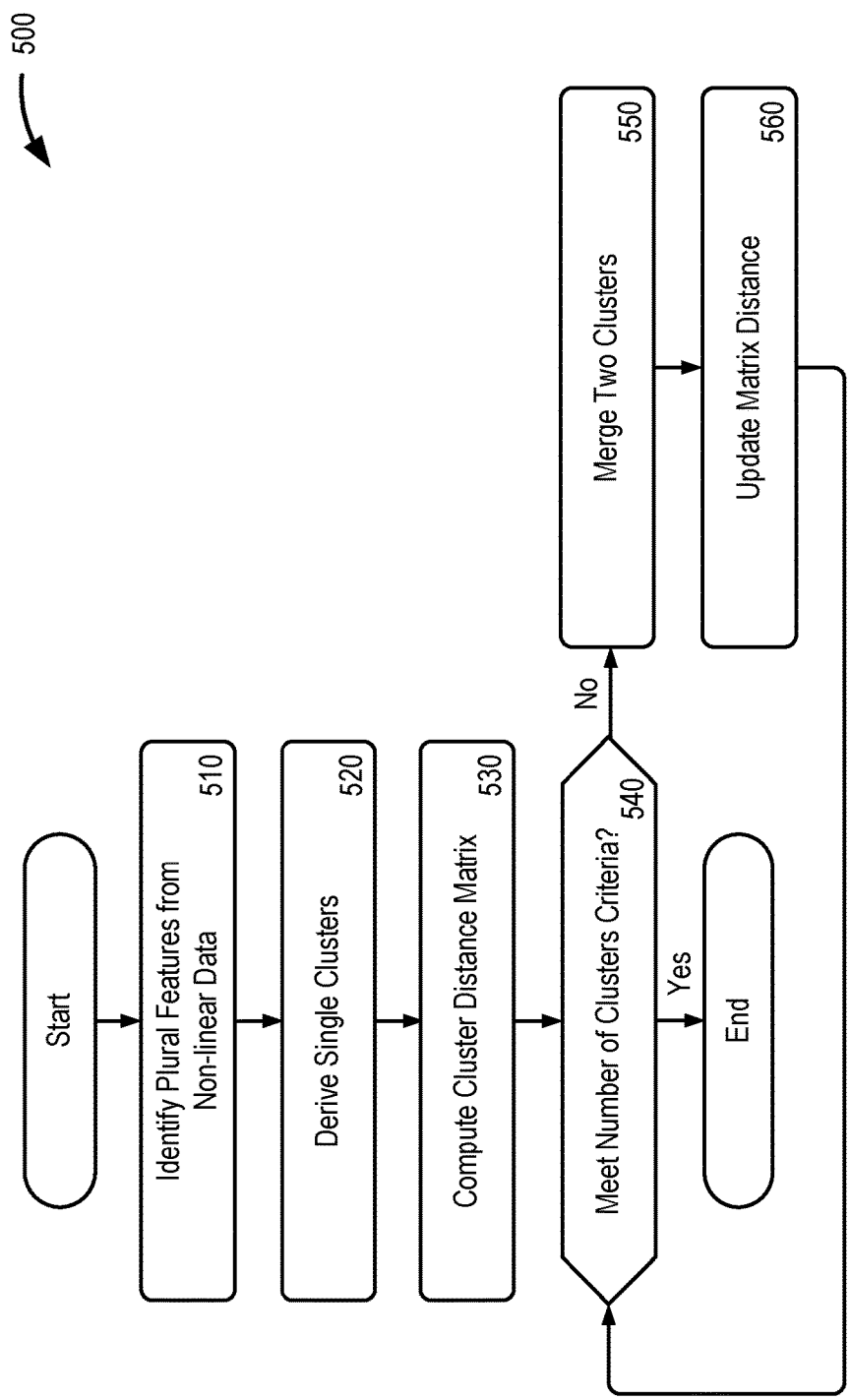
Figure 6:
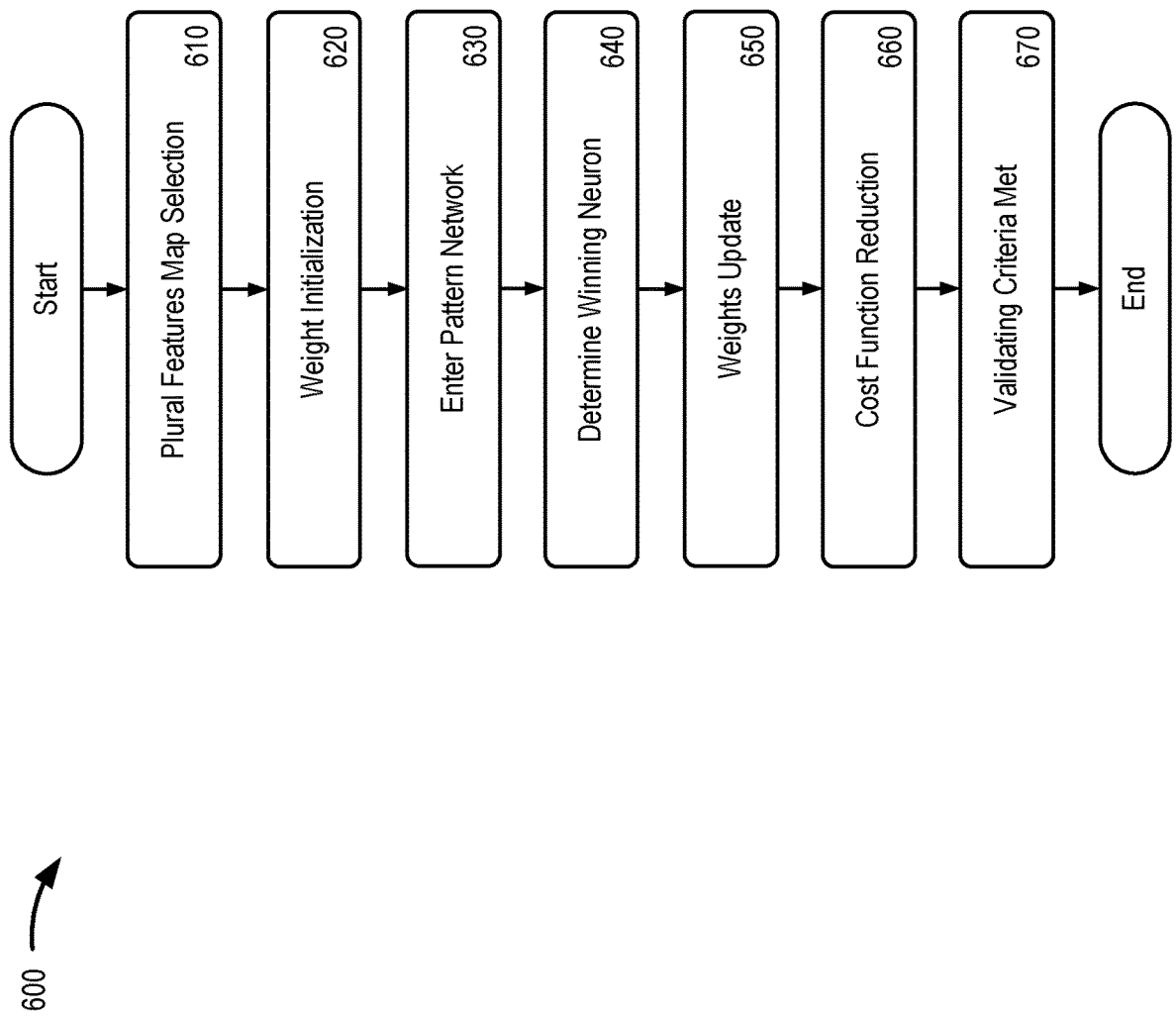

FIGS. 4-6 are flow diagrams illustrating a process 400 for performing multi-class plural-factored elastic clustering. Process 400 may be performed, for example, by MPEC compute pipeline 220. Some portions of process 400 are discussed below in the context of graph 900 of FIG. 9, which illustrates concepts described herein.

Figure 9:
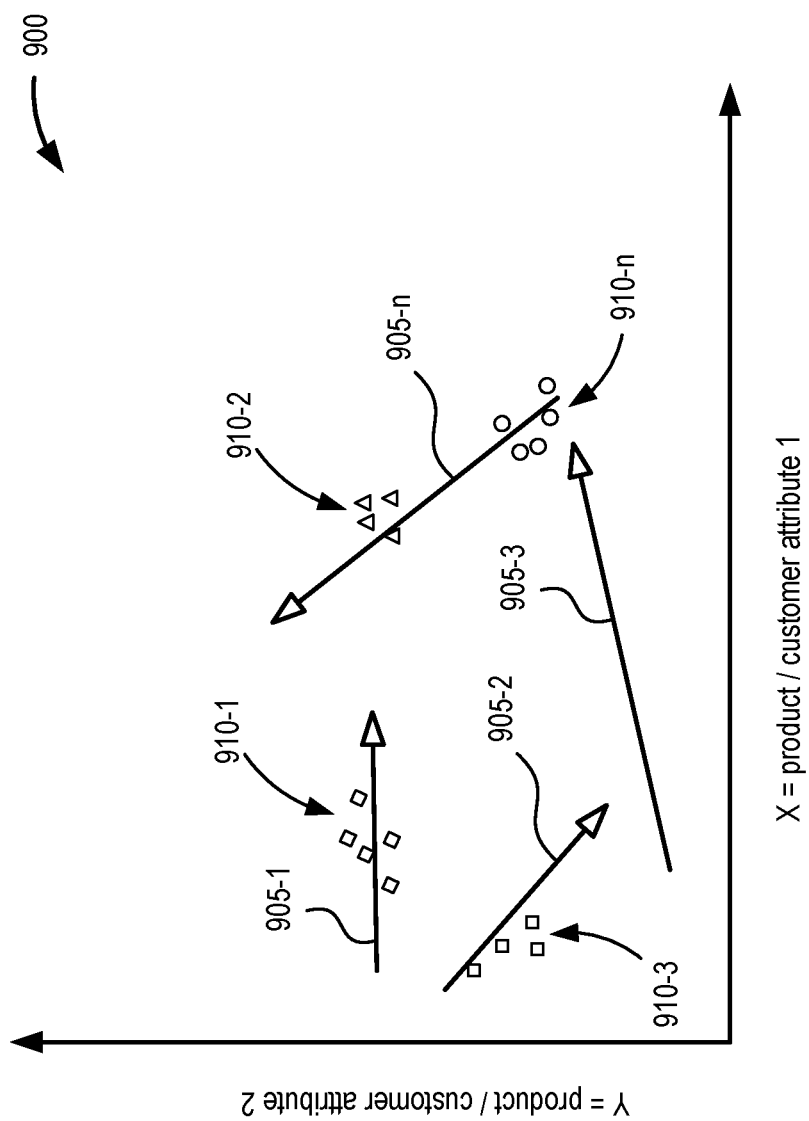
FIG. 9 is an illustration of plot of coefficient slope vectors and data point clusters, according to an implementation described herein.

Referring to FIG. 4, process 400 may include computing a plurality of elasticity coefficients (block 410), and obtaining multiple elasticity slope vectors (block 420). For example, MPEC compute pipeline 220 may receive preprocessed data from data ingestion system 210 and compute a plurality of elasticity coefficients, such as a price elasticity of demand or price elasticity of supply. The plurality of elasticity coefficients may reflect, for example, the degree to which the effective demand for a product or service changes as the respective price or supply changes. A typical analysis may use one coefficient to forecast one particular factor. In contrast, according to implementations described herein, multiple coefficients are used to derive a slope vector for a two-dimensional X-Y plane, where regression analysis is applied to determine a slope for plotted points of each customer attribute. The customer attributes in some cases are complex, comprising composites of multiple attributes. Multi-plurality of the attributes results in a continuum of archetypes. Typical clustering and classification algorithms fail to provide granularity in a continuum. MPEC enables segmentation of complex archetypes into distinct quadrants in a two-dimensional X-Y plane. For example, as illustrated in FIG. 9, multiple slopes 905-1 through 905-$n$ may be calculated for different products and attributes that identify the elasticity in multiple characteristic dimensions.

Process 400 may also include computing plural clusters from distance discriminant analysis (block 430), and embedding multi-class clusters into the elasticity slope vectors (block 440). For example, using clustering algorithms, such as K-means clustering, random forest classification, etc., MPEC compute pipeline 220 may derive clusters of data points, such as clusters 910-1 through 910-$n$ of FIG. 9. In other implementations, MPEC compute pipeline 220 may apply Pareto analysis, Density-Based Spatial Clustering of Applications with Noise (DBSCAN), Expectation minimization (EM), or agglomerative hierarchical clustering to compute the plural clusters. These clusters 910 may be added on to the coefficient slope vectors 905 and placed accordingly. In other words, the slope vectors 905 may be used as heightened planes and orders to separate the multiple clusters. The clusters represent distinct statistical limits and properties for multi-dimensional profiling. According to an implementation, linear distance measurements may be used to discriminate how each cluster 910 is separated within the space of each slope vector 905. Thus, high granularity may be obtained in a collection of multiple features.

Process 400 may further include computing specific class bins in K-means (block 450), and assign specific class bins (block 460). For example, MPEC compute pipeline 220 may identify distinct bins for different classifications, such as different bins of customers, different bins of prices, different bins of geographical areas, or different bins of composites. Bins may be differentiated, for example, with specific numerical gradients and/or thresholds. The binning of clusters may be performed using, for example, K-means algorithms, Pareto analysis. The approach enables clustering on linearity functions derived from complex non-linear data. Clusters may be assigned to different bins based on statistical limits.

Process 400 may include sub-processes 500 and 600 of FIGS. 5 and 6, respectively. Sub-process 500 may be executed, for example, to refine clusters for process blocks 430 and 440. Process 500 may include identifying plural features from non-linear data (block 510), deriving individual clusters (block 520), computing a cluster distance matrix (block 530), and determining the number of clusters meets a selected criteria based on the distance matrix using elbow methods (block 540). For example, MPEC compute pipeline 220 may detect groups of data points, composites, archetypes, etc., associated with a customer, product or service and derive an initial set of individual clusters (e.g., clusters 910). MPEC compute pipeline 220 may compute a cluster distance matrix for each cluster based on a distance from slope vectors 910 and determine if the number of clusters is appropriate. For example, MPEC compute pipeline 220 may use an elbow method to determine an optimal number of clusters.

Sub-process 500 may also include merging clusters, if there are too many clusters (block 550), and updating the matrix distance for the merged cluster (block 560). For example, if MPEC compute pipeline 220 determines that the number of clusters is too large adjacent clusters may be merged until an acceptable number of clusters is achieved.

Figure 10:
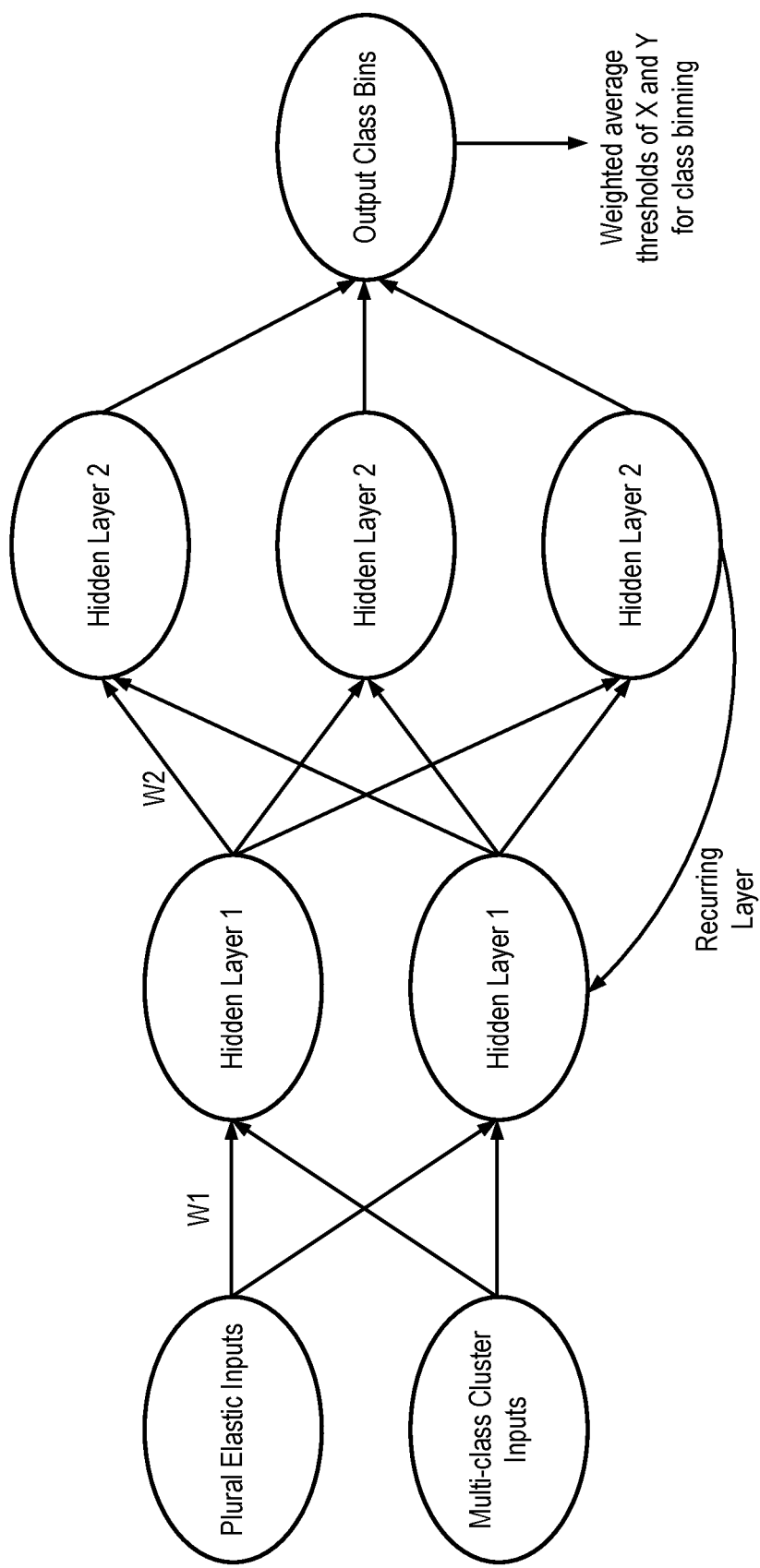
FIG. 10 is a schematic of a neural network for an MPEC process, according to an exemplary implementation.

Sub-process 600 may be executed, for example, to use a convolutional neural network (CNN) or artificial neural network (ANN). Sub-process 600 may be executed, for example, to refine and optimize models for process blocks 430 through 460. Sub-process 600 may include selecting a plural features map (block 610), performing weight initialization (block 620), entering a pattern network (block 630), determining a winning neuron (block 640), updating the assigned weight (block 650), conducting cost function reduction (block 660), and confirming validating criteria is met (670). For example, as illustrated in FIG. 10, MPEC compute pipeline 220 may perform cost reduction and model refinement using a mode similar to FIG. 10, where weights (e.g., W1, W2) between nodes are optimized accordingly to provide a least-cost path to output class bins. Bins may be defined based on the weighted average thresholds for each bin.

Figure 7:
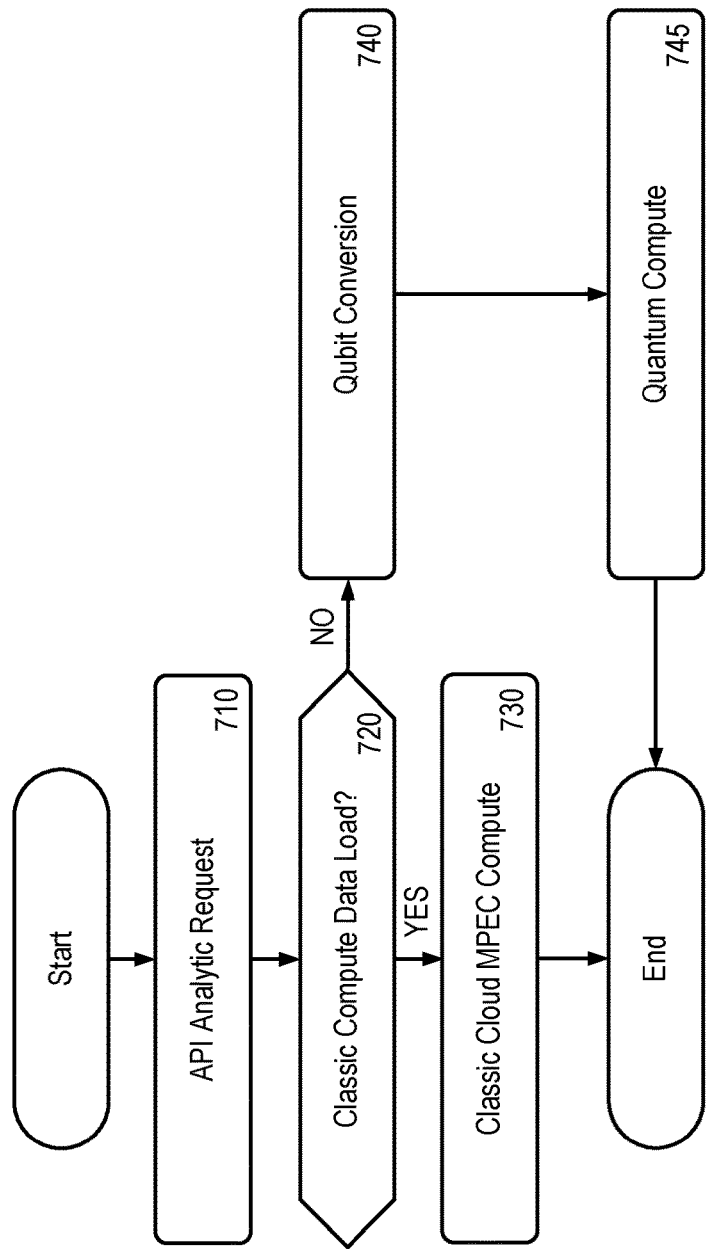
FIGS. 7 and 8 are flow diagrams illustrating an MPEC convert algorithm for the demand forecasting service.
Figure 8:
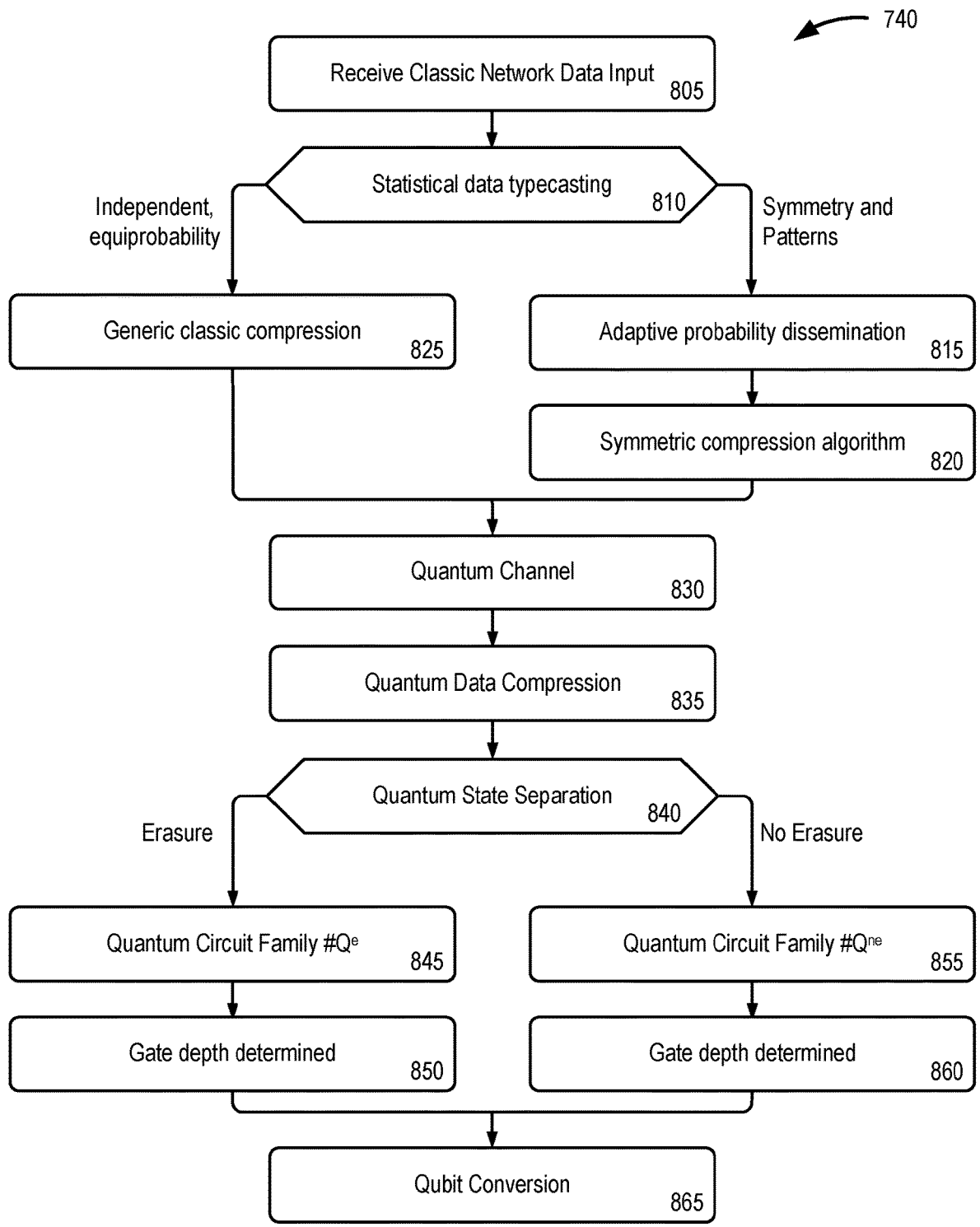

FIGS. 7 and 8 are flow diagrams illustrating a process 700 for performing decision making for conversion of data from classic bits to quantum bits (or qubits). Process 700 may be performed, for example, by MPEC compute pipeline 220. Process 700 may correspond, for example, to blocks 330-345 of FIG. 3.

Referring to FIG. 7, process 700 may include receiving an API analytic request (block 710), and determining if the data load can be timely managed using classic compute bits (block 720). For example, an analytic request from a customer (e.g., using end device 110) may define particular factors or output to predict demand for a network product or service. The analytic request may be formatted (e.g., using an API) into a format that can be ingested, for example, at MPEC build 330. Based on the number of factors, the type of data, the data volume, etc., MPEC compute pipeline 220 may determine if the data load is more efficient with classic computing bits or qubits. For example, using the time stamp on a data storage system, thresholds could be used to define and determine a data load. For a load exceeding a classical computing threshold, the data can be directed to quantum processes.

If the data load can be more timely managed using classic compute bits (block 720 —Yes), process 700 may include processing the analytic request using classic cloud computing (block 730). For example, MPEC compute pipeline 220 may apply data to an MPEC compute process (e.g., process 400) using classic bits, such as shown at MPEC compute 345 of FIG. 3.

If the data load can be more timely managed using quantum computing (block 720—No), process 700 may include performing qubit conversion (block 740). Process block 740 may correspond to qubit convert block 335 of FIG. 3. The qubit convert may use multiple approaches to create quantum states to convert classical data. For example, compression in a classic environment, decompression in a quantum environment enhances bit to qubit conversion performance even more than direct conversion. However, the decision for the use of this compression and decompression depends on the type of data. Independent and equiprobable data would not need compression, while asymmetric and predicted patterns benefit with compression and decompression. Principles from nuclear magnetic resonance spectroscopy that are used to detect proton-proton interactions using pulse sequences may be applied to the quantum gate sequences for optimization of quantum operations fine-tuned for MPEC. For example, depending on the number of factors and the type of data required for an analytic request, data matrices will be routed through quantum state preparation procedures. Process block 740 is described further in connection with FIG. 8.

As illustrated in FIG. 8, process block 740 may include receiving classic network data input (block 805) and performing statistical data typecasting (block 810). For example, the quantum state preparation may include data typecasting that may be done by detecting patterns and symmetry in the data. In the event of detected symmetry (block 810—"symmetry and patterns"), adaptive probability dissemination protocols may be used (block 815), and an optimal/symmetric compression algorithm may be used in classic computing environment (block 820). In the event of lack of symmetry (block 810—"independent, equiprobability"), all data may be treated uniformly with generic compression algorithms in classic environment (block 825).

After performing the generic classic compression or symmetric compression, data is fed into a quantum channel (block 830). The quantum channel of MPEC pipeline 220 may include a computing device that operates on the principles of quantum mechanics capable of mapping classical bits into qubits. The quantum channel may perform quantum data decompression (block 835). Compression in classic environments and decompression in quantum environments respectively and collectively enhance overall computing performance in comparison to classical circuitry.

MPEC compute pipeline 220 may use variational gate optimization for multi-qubit operations. For example, the quantum channel may perform quantum state separation (block 835) to sort the quantum data based reusability (e.g., erasure or no erasure). For erasure (block 840—"erasure"), data may be routed to an erasure quantum circuit family (block 845) and a gate depth may be determined (block 850). For no erasure (block 840—"no erasure"), data may be routed to a no erasure quantum circuit family (block 855) and a gate depth may be determined (block 860). Based on the determined gate depth, MPEC compute pipeline 220 may perform qubit conversion based on the selected gate (block 865).

Returning to FIG. 7, after a qubit conversion is performed, process 700 may include performing quantum compute (block 745) in the cloud infrastructure or in an in-house quantum channel. Process block 745 may correspond to quantum AI block 340 of FIG. 3. For example, MPEC compute pipeline 220 may apply quantum data to an MPEC compute process using qubits to assign bins in near real time or in real-time streaming with computationally heavy machine learning.

Figure 11:
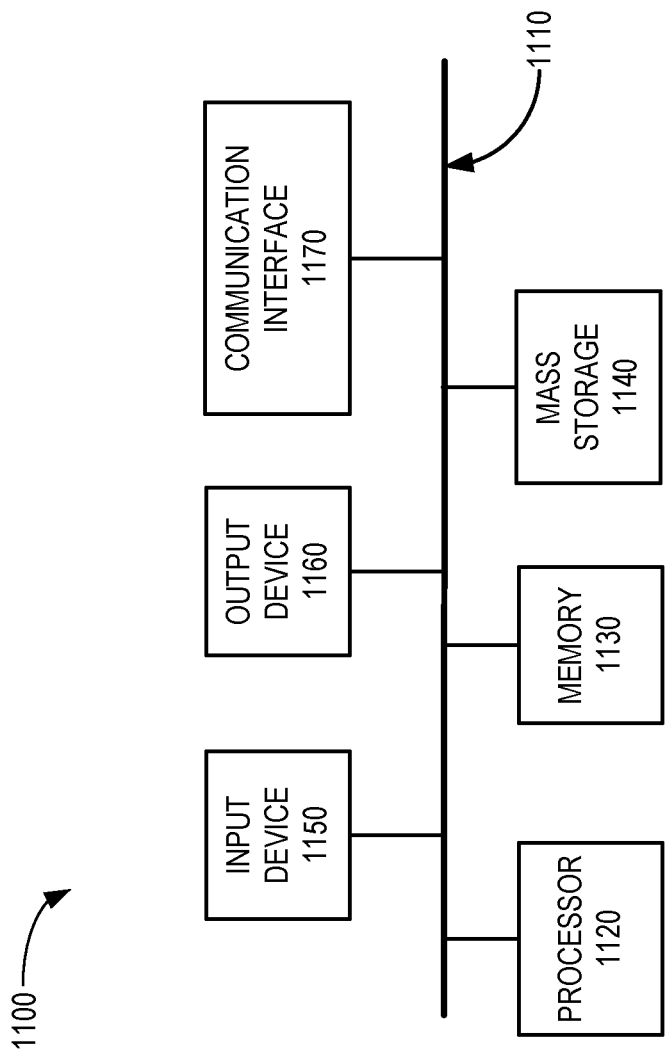
FIG. 11 is a block diagram depicting exemplary components of a device that may correspond to one or more of the devices in FIGS. 1 and 2.

FIG. 11 is a block diagram depicting exemplary components of a device 1100 that may correspond to end device 110, wireless station 125, or one of network devices 135/145/155/165, or devices in MPEC platform 170 (including quantum channels). End device 110, wireless station 125, network devices 135/145/155/165, or MPEC platform 170 may include one or more devices 1100. Device 1100 may include a bus 1110, a processor 1120, a memory 1130, mass storage 1140, an input device 1150, an output device 1160, and a communication interface 1170.

Bus 1110 includes a path that permits communication among the components of device 1100. Processor 1120 may include any type of single-core processor, multi-core processor, microprocessor, latch-based processor, and/or processing logic (or families of processors, microprocessors, and/or processing logics) that interprets and executes instructions. In other embodiments, processor 1120 may include an application-specific integrated circuit (ASIC), a field-programmable gate array (FPGA), and/or another type of integrated circuit or processing logic. For example, the processor 1120 may be an x86 based CPU, and may use any operating system, which may include varieties of the Windows, UNIX, and/or Linux. The processor 1120 may also use high-level analysis software packages and/or custom software written in any programming and/or scripting languages for interacting with other network entities and providing applications to, for example, a plurality of data reporting device 205 which are communicatively coupled to service network 160.

Memory 1130 may include any type of dynamic storage device that may store information and/or instructions, for execution by processor 1120, and/or any type of non-volatile storage device that may store information for use by processor 1120. For example, memory 1130 may include a RAM or another type of dynamic storage device, a ROM device or another type of static storage device, and/or a removable form of memory, such as a flash memory. Mass storage device 1140 may include any type of on-board device suitable for storing large amounts of data, and may include one or more hard drives, solid state drives, and/or various types of redundant array of independent disks (RAID) arrays. Mass storage device 1140 may be suitable for storing data associated with data sources 205 for distributing uniform format messages to, for example, MPEC platform 170.

Input device 1150, which may be optional, can allow an operator to input information into device 1100, if required. Input device 1150 may include, for example, a keyboard, a mouse, a pen, a microphone, a remote control, an audio capture device, an image and/or video capture device, a touch-screen display, and/or another type of input device. In some embodiments, device 1100 may be managed remotely and may not include input device 1150. Output device 1160 may output information to an operator of device 1100. Output device 1160 may include a display, a printer, a speaker, and/or another type of output device. In some embodiments, device 1100 may be managed remotely and may not include output device 1160.

Communication interface 1170 may include a transceiver that enables device 1100 to communicate over communication links with other devices and/or systems. Communications interface 1170 may be a wireless communications (e.g., radio frequency (RF), infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 1170 may include a transmitter that converts baseband signals to RF signals and/or a receiver that converts RF signals to baseband signals. Communication interface 1170 may be coupled to one or more antennas for transmitting and receiving RF signals. Communication interface 1170 may include a logical component that includes input and/or output ports, input and/or output systems, and/or other input and output components that facilitate the transmission/reception of data to/from other devices. For example, communication interface 1170 may include a network interface card (e.g., Ethernet card) for wired communications and/or a wireless network interface (e.g., a Wi-Fi) card for wireless communications. Communication interface 1170 may also include a universal serial bus (USB) port for communications over a cable, a Bluetooth wireless interface, a radio-frequency identification (RFID) interface, a near-field communication (NFC) wireless interface, and/or any other type of interface that converts data from one form to another form.

As described below, device 1100 may perform certain operations relating to the unified collection service. Device 1100 may perform these operations in response to processor 1120 executing software instructions contained in a computer-readable medium, such as memory 1130 and/or mass storage 1140. The software instructions may be read into memory 1130 from another computer-readable medium or from another device. The software instructions contained in memory 1130 may cause processor 1120 to perform processes described herein. Alternatively, hardwired circuitry may be used in place of, or in combination with, software instructions to implement processes described herein. Thus, implementations described herein are not limited to any specific combination of hardware circuitry and software.

Although FIG. 11 shows exemplary components of device 1100, in other implementations, device 1100 may include fewer components, different components, additional components, or differently-arranged components than depicted in FIG. 11.

FIG. 12 is an illustration of concepts of an MPEC process for a particular use case. In the example of FIG. 12, the fluidity of integrating the elasticity coefficients with a plurality of product and customer features in a neural network is depicted. Elasticity slopes constitute the threads in which the clusters are embedded in the MPEC. MPEC compute pipeline 220 may receive preprocessed data from data ingestion system 210 and compute a plurality of elasticity coefficients. A plurality of product features includes pricing history, transaction analysis, geographical features, characteristic features, and competitive features. A plurality of customer features includes business sector, revenue, regional information, market capture, time stamps, size, and profitability.

Systems and methods described herein provide demand forecasting service for telecommunications services in a network and network optimization with network data typecasting. The systems and methods use classical and quantum computing devices. The computing devices evaluate data types using statistical symmetry recognition and operate between classical and quantum environments. In one implementation, computing devices receive deposited data, batch data, and streamed data that relates to telecommunications services and segregate the data into spatial and temporal factors. The computing devices receive an analytic request for a forecast of the telecommunications services and conduct a multi-class plural-factored elastic cluster (MPEC) analysis for the telecommunications services using the segregated data distilled in data processing pipelines. The MPEC analysis includes generating vectors comprised of slopes from plural coefficients to determine demand elasticity from plural features. The computing devices generate, based on the multi-class plural-factored elastic cluster model, a real-time demand-based forecast for the telecommunications services, and network demand present the demand-based forecast to a user/network optimization engineer.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 3-7, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 1120, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 1120) of a device. A non-transitory storage medium includes one or more of the storage mediums described in relation to memory 1130.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method comprising:
   obtaining, by one or more computing devices in a network, segregated data for telecommunications services;
   conducting, by the one or more computing devices, a multi-class analysis using the segregated data, wherein conducting the multi-class analysis comprises converting at least some of the segregated data from classic bits to quantum bits and determining demand elasticity from plural features; and
   generating, by the one or more computing devices and based on the multi-class analysis, a demand-based forecast for the telecommunications services.

2. The method of claim 1, wherein the segregated data is segregated based on spatial and temporal factors.

3. The method of claim 1, wherein conducting the multi-class analysis includes:
   generating vectors comprised of slopes from a plurality of elasticity coefficients for factors for a multi-class plural-factored elastic cluster (MPEC) analysis.

4. The method of claim 1, wherein conducting the multi-class analysis further comprises:
   computing a plurality of elasticity coefficients for factors for the multi-class analysis,
   obtaining multiple elasticity slope vectors,
   computing multiple clusters,
   embedding multi-class clusters within the elasticity slope vectors, and
   assigning output class bins.

5. The method of claim 1, wherein the demand-based forecast includes:
   a telecommunication product geographic demand forecast,
   a telecommunication product temporal demand forecast, or
   a telecommunication service deployment forecast.

6. The method of claim 1, wherein the segregated data includes a combination of deposited data, batch data, and streamed data.

7. The method of claim 1, wherein conducting the multi-class analysis further comprises:
   assigning a gate for quantum bit conversion based on a matrix structure of the segregated data.

8. The method of claim 1, wherein converting the segregated data from classic bits to quantum bits further comprises:
   conducting statistical symmetry and pattern evaluation of the segregated data,
   assigning a compression protocol based on the statistical symmetry and pattern evaluation,
   performing quantum data compression using the assigned compression protocol to generate compressed data, and
   assigning one of a qubit erasure protocol or a qubit non-erasure protocol to the compressed data.

9. The method of claim 1, wherein conducting the multi-class analysis further comprises:
   identifying the plural features,
   deriving individual clusters from plots of the plural features, and
   computing a cluster distance matrix for each of the individual clusters.

10. A device comprising:
    one or more processors configured to:
    obtain segregated data for telecommunications services;
    conduct a multi-class analysis using the segregated data, wherein conducting the multi-class analysis comprises converting at least some of the segregated data from classic bits to quantum bits and determining demand elasticity from plural features; and
    generate, based on the multi-class analysis, a real-time demand-based forecast for the telecommunications services.

11. The device of claim 10, wherein the segregated data is segregated based on spatial and temporal factors.

12. The device of claim 10, wherein, when conducting the multi-class analysis, the one or more processors are configured to:
    generate vectors comprised of slopes from a plurality of elasticity coefficients for factors for a multi-class plural-factored elastic cluster (MPEC) analysis.

13. The device of claim 10, wherein the real-time demand-based forecast includes:
    a telecommunication product geographic demand forecast,
    a telecommunication product temporal demand forecast, or
    a telecommunication service deployment forecast.

14. The device of claim 10, wherein the segregated data includes weather forecast data, and wherein, when conducting the multi-class analysis, the one or more processors are further configured to use weather forecast integrated elastic clusters.

15. The device of claim 10, wherein, when conducting the multi-class analysis, the one or more processors are further configured to:
    assign a gate for quantum bit conversion based on a matrix structure of the segregated data.

16. The device of claim 10, wherein, when conducting the multi-class analysis, the one or more processors are further configured to:
    obtain multiple elasticity slope vectors,
    compute multiple clusters, and
    embed multi-class clusters within the elasticity slope vectors.

17. A non-transitory, computer-readable storage medium storing instructions, executable by a processor of a network element, for:
    obtaining, by one or more computing devices in a network, segregated data for telecommunications services;

conducting, by the one or more computing devices, a multi-class analysis using the segregated data, wherein conducting the multi-class analysis comprises converting at least some of the segregated data from classic bits to quantum bits and determining demand elasticity from plural features; and generating, by the one or more computing devices and based on the multi-class analysis, a real-time demand-based forecast for the telecommunications services.

18. The non-transitory, computer-readable storage medium of claim 17, wherein the instructions to conduct the multi-class analysis further include instructions for:

conducting a multi-class plural-factored elastic cluster (MPEC) analysis.

19. The non-transitory, computer-readable storage medium of claim 17, wherein the instructions to conduct the multi-class analysis further include instructions for:

assigning a gate for quantum bit conversion based on a matrix structure of the segregated data.

20. The non-transitory, computer-readable storage medium of claim 17, wherein the instructions to conduct the multi-class analysis further include instructions for:

identifying the plural features, deriving individual clusters from plots of the plural features, and computing a cluster distance matrix for each of the individual clusters.

* * * * *